Feb. 11, 1936.                    R. F. DIRKES ET AL                     2,030,812
                                  PROJECTION SYSTEM
                                 Filed Jan. 23, 1934                   2 Sheets-Sheet 1
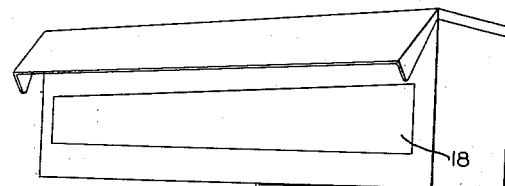
FIG. 1
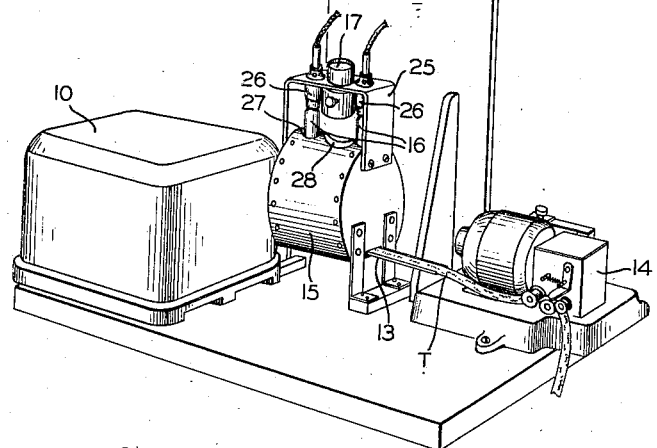
FIG. 2
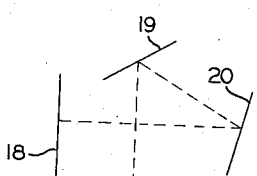
FIG. 3
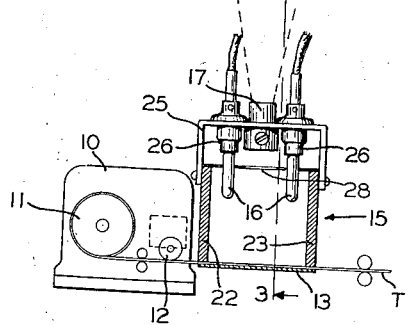
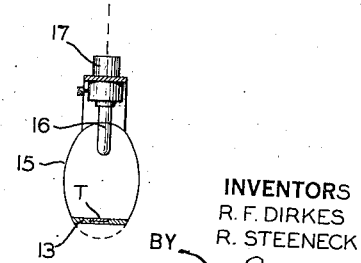
INVENTORS
R. F. DIRKES
R. STEENECK
BY Eugene C. Brown
ATTORNEY Feb. 11, 1936.  R. F. DIRKES ET AL  2,030,812
PROJECTION SYSTEM
Filed Jan. 23, 1934  2 Sheets-Sheet 2
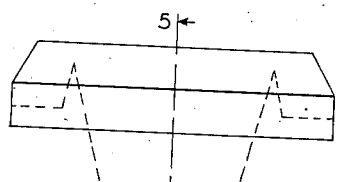
FIG. 4
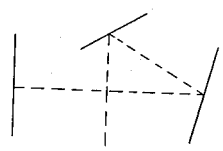
FIG. 5
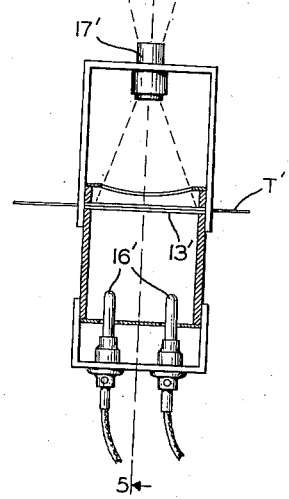
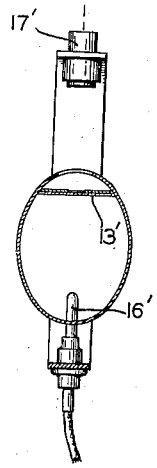
FIG. 6
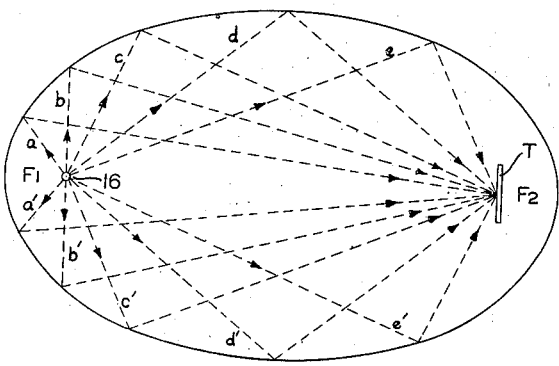
INVENTORS
R. F. DIRKES
BY R. STEENECK
Eugene C. Brown
ATTORNEY Patented Feb. 11, 1936

2,030,812

UNITED STATES PATENT OFFICE 2,030,812

PROJECTION SYSTEM

Robert F. Dirkes, Jamaica, and Robert Steeneck, New York, N. Y., assignors to The Western Union Telegraph Company, New York, N. Y., a corporation of New York Application January 23, 1934, Serial No. 707,972

13 Claims. (Cl. 88—24)

This invention relates to a projecting system and more particularly to a ticker tape projector by which characters printed upon a narrow tape may be projected upon a screen in enlarged characters.

In stock ticker tape projectors, now in commercial use, the length of tape projected at any instant is approximately five inches. The width of the tape is approximately three-quarters of an inch. Preferably it is composed of cellophane or other transparent or translucent material. In order to obtain a distinct image on the screen of the characters appearing on the tape, it is essential that the tape be illuminated evenly and brilliantly throughout its entire length. Heretofore, difficulty has been experienced in obtaining the required degree of illumination of the tape. Various methods have been proposed.

Obviously, if an ordinary spherical condensing lens is employed between a point source of light and the tape, having a field wide enough to include the entire five inch length of the tape, the major portion of the light collected by the lens will fall to either one side or the other side of the tape and will be wasted. That is, the tape will extend in a narrow band across the center of a large circular illuminated area. Moreover, with such systems the intensity of the light falls off very rapidly towards the outer edge of the illuminated area so that the illumination at the ends of the tape is not as intense as that at the center.

The concentrated filament projection lamp employed as the light source, develops a large amount of heat and since the printing tickers are arranged as closely to the projecting system as possible, in order to reduce the lag between printing of the quotations and their appearance on the screen, it is desirable to employ a light source of the lowest intensity consistent with proper illumination, in order to reduce the deleterious effect of the heat upon the printing mechanism. Excessive heat of the printer naturally impairs its operation.

One of the objects of the present invention is to produce an illuminating system for a long length of a ticker tape or similarly shaped object of much greater efficiency than heretofore obtained.

Another object is to evenly and brilliantly illuminate the entire projecting length of the tape.

A further object is to provide an illuminating beam having a cross sectional form approximating the form of the tape to be projected.

A still further object is to produce an illuminating system for a ticker tape projector which will cause the light ordinarily wasted at either side of the tape to be concentrated upon the tape.

Other objects and advantages of the invention will hereinafter appear.

The essential features of the invention are shown in the accompanying drawings, wherein Figure 1 is a prospective view of a ticker tape projecting system embodying our invention;

Figure 2 is a sectional view of the illuminating system therefor;

Figure 3 is a sectional view taken on the line 3—3 of Figure 2;

Figure 4 is a sectional view of a modified form of illuminating system;

Figure 5 is a sectional view on the line 5—5 of Figure 4; and

Figure 6 is a diagram illustrating the principle of the illuminating system.

Referring to Figures 1, 2 and 3, the ticker tape projector is shown as comprising a stock ticker 10 of conventional form, by which quotations or other information is printed upon a tape T. The tape passes from a reel 11 in the ticker, beneath the type wheel 12 and then directly across a support 13 to a tape pulling device 14. The tape pulling device forms the sole means for moving the tape past the type wheel 12, the usual tape ejecting mechanism of the printer having been removed. However, the construction of the pulling mechanism forms no part of the present invention and is fully described in a copending application, Serial No. 718,044, filed March 29, 1934, and entitled Tape puller for projectors. It is sufficient to say for the purpose of the present invention that no loop is permitted to form between the type wheel 12 and the field of the projector and therefore the projector may be placed very close to the ticker so as to reduce the amount of tape therebetween. In this manner the lag between the printing of the quotation and its appearance on the screen is substantially reduced. The support 13 forms the lower wall of a reflector 15 within which are mounted a pair of concentrated filament lamps 16, which serve to illuminate the tape. The image of the tape is projected by a lens 17 on to a screen 18 disposed above the reflector. Mirrors 19 and 20 serve to direct the projected image on to the screen 18.

The reflector 15 is in the form of an elliptical cylinder along the lower linear focus of which the tape guide 13 extends, the tape being drawn through the guide with the printed side uppermost. The ends of the reflector are closed by end walls 22 and 23 which may be provided with suitable ventilating apertures.

Mounted above the reflector is a support 25 to which are adjustably secured a pair of lamp sockets 26 in which the lamps 16 are mounted. The lamps extend through apertures 27 in the upper wall of the reflector and are positioned therein so as to bring the filament substantially along the line of the upper focus of the elliptical cylinder.

The objective lens system 17 is also adjustably secured in the support 25 in alignment with an aperture 28, in the reflector between the lamps 16.

It is a property of an ellipse that two lines drawn from the foci to a point on the circumference of the ellipse will form equal angles with a tangent to the ellipse at that point. Consequently with a light source placed at one focus of the elliptical cylindrical reflector all rays of light emitted therefrom will be reflected from the surface of the reflector to the other focus. This is shown in Fig. 6 in which 16 indicates the light source placed at one focus F1 and T indicates a tape placed cylindrically with respect to the opposite focus F2. The various rays a, a', b, b', etc. originating at focus F1 are all concentrated at the opposite focus F2. In the case of an elliptical cylinder this is true not only of the light emitted in the plane of the lamp normal to the axis of the cylinder but also in the case of obliquely emitted rays. Consequently with one or more lamps having their filaments situated substantially on one linear focus of the cylinder the light will come to the focus along the opposite linear focus. Theoretically with a point source of light a line focus will be obtained. However, due to the fact that light source has substantial area so that a portion thereof is displaced from a focal line of the cylinder, the rays do not come to an exact focus along the opposite focal line but spread out to each side thereof producing a band focus. By suitably choosing the constants of the ellipse in relation to the area and location of the light source relative to one focus and the position of the tape relative to the other, a band of illumination having a width substantially that of the tape may be obtained. If the surface of the elliptical cylinder is formed of a high class reflector substantially all of the light emitted is ultimately reflected upon the tape, and consequently a high efficiency of illumination is obtained.

In Figs. 1, 2 and 3 I have shown the tape illuminated by reflected light. In Figs. 4 and 5 a modification is shown in which the tape is illuminated by transmitted light. In this latter case a tape T' of transparent or translucent material is employed. This embodiment differs from the former only in disposing the lamps 16' in the base of the elliptical cylinder along the lower focus with the tape disposed on a transparent or translucent support 13' extending along the upper focal line. The objective lens 17' is disposed above the tape so as to include the full illuminated length thereof. In order to eliminate bright spots on the tape due to directly radiated light from the lamps 16' the support 13' is preferably of a diffusing nature.

While we have shown two embodiments of the invention it is to be understood that other embodiments thereof will occur to those skilled in the art and therefore we do not desire to be limited to the particular arrangement shown but contemplate all obvious variations thereof as come within the scope of the appended claims.

What we claim is:

1. A projecting apparatus comprising a source of light, an elongated object to be illuminated, an elliptical cylinder reflector positioned with one linear focus intersecting said light source, a support for said object extending across said reflector substantially in the plane of the other linear focus and serving to close said reflector, a screen, and means for projecting an image of said object on said screen.

2. A projecting apparatus comprising a source of light, an object to be illuminated having a length several times its width, an elliptical cylinder reflector positioned with one linear focus substantially intersecting said light source and with the other linear focus substantially in the plane of said object and parallel to its major dimension, a screen, and means for projecting an image of said object on said screen.

3. A projecting apparatus comprising an elliptical cylinder reflector, a plurality of light sources positioned substantially along one linear focus of said reflector, means for supporting a ticket tape substantially along the opposite linear focus with its major dimension parallel thereto, a screen, and means for projecting an image of said tape on said screen.

4. A projecting apparatus comprising an elliptical cylinder reflector, a plurality of light sources positioned along one focal line of said reflector, means for supporting a ticket tape substantially along the opposite focal line, means for moving said tape along said latter focal line, said reflector having an aperture therein through which light is reflected from said tape, a screen, and means for projecting an image of said tape through said aperture onto said screen.

5. A projecting apparatus, comprising an elliptical cylinder reflector, a pair of spaced light sources positioned along one focal line of said reflector, an elongated object disposed along the other focal line, having its major dimension parallel to said focal line, a screen, and an objective lens system positioned between said light sources and arranged to project an image of said object on said screen.

6. A projecting apparatus comprising a substantially closed housing in the form of an elliptical cylinder, said housing having an interior reflecting surface, a light source positioned within said housing substantially along one focal line of said elliptical cylinder, a support disposed substantially along the opposite focal line, means for moving an object along said support, a screen, and an objective lens system arranged to project an image of said object onto said screen.

7. A projecting apparatus, comprising a substantially closed housing in the form of an elliptical cylinder having an inner reflecting surface, a lamp mounted externally of said housing and projecting into said housing, with the incandescent element thereof substantially in one focal line of said elliptical cylinder, means for adjusting said light source relative to said focal line, a support disposed along said other focal line, in a plane parallel to the minor axis of the elliptical cylinder, a tape guide in said support, means for passing a tape through said guide, a screen, and means for projecting an image of said tape onto said screen.

8. A projecting apparatus, comprising a substantially closed housing in the form of an elliptical cylinder, having an inner reflecting surface, a light source within said housing disposed substantially along one focal line of the cylinder, a support disposed along the opposite focal line, adapted to support and guide an object through said housing, a screen, and an objective lens system on the same side of said support as said light source for projecting an image of said object on said screen.

9. A projecting apparatus comprising an elliptical cylinder reflector with the axis of the cylinder horizontal, means for passing a tape along the lower focal line of said cylinder, parallel to said axis, a light source disposed substantially along the upper focal line, a screen, said reflector having an aperture therein through which light is reflected from said tape and an objective lens system diposed above said tape adjacent said aperture and adapted to project an image of the tape onto said screen.

10. A projecting apparatus comprising an elliptical cylinder reflector with the axis of the cylinder horizontal, means for passing a transparent tape along the upper focal line of the cylinder parallel to said axis, a light source disposed substantially along the lower focal line, a screen, said reflector having an aperture therein through which light is reflected from said tape and an objective lens system positioned above said tape adjacent said aperture and adapted to project an image of the tape onto said screen.

11. A projecting apparatus comprising an elliptical cylinder having an inner reflecting surface, a light source disposed substantially along one focal line of said cylinder, a tape support disposed within said cylinder along the opposite focal line and arranged to guide a tape through the cylinder in a direction parallel to the axis thereof, a screen, and an objective lens system disposed on the opposite side of said support from said light source, for projecting light transmitted through said tape onto said screen.

12. A projecting apparatus comprising an elliptical cylinder having an inner reflecting surface, a light source disposed substantially along one focal line of said cylinder, a tape support having light diffusing properties disposed along the opposite focal line, said support being arranged to guide a transparent tape substantially along said focal line, a screen and an objective lens arranged to project light transmitted through said support and tape onto said screen.

13. A projecting apparatus comprising an elliptical cylinder reflector, means for passing the tape along one focal line of said cylinder, a light source disposed substantially along the other focal line, a screen, said reflector having an aperture therein through which light is reflected from said tape, and an objective lens system arranged to project an image of the tape onto said screen.

ROBERT F. DIRKES.
ROBERT STEENECK.